US000002015H

(19) United States

(12) Statutory Invention Registration (10) Reg. No.: US H2015 H

Waters (43) Published: Mar. 5, 2002

(54) COMMUNICATIONS SYSTEM USING A SHARPLY BANDLIMITED KEYING WAVEFORM

(75) Inventor: William M. Waters, Millersville, MD (US)

(73) Assignee: The United States of America as represented by the Secretary of the Navy, Washington, DC (US)

(21) Appl. No.: 08/414,824

(22) Filed: Mar. 31, 1995

(51) Int. Cl.[7] ..... H04B 1/66

(52) U.S. Cl. ..... 375/240

(58) Field of Search ..... 375/240, 353, 375/300; 370/114, 118; 332/115; 341/147

(56) References Cited

U.S. PATENT DOCUMENTS

| | | | |
|---|---|---|---|
| 4,227,250 A | 10/1980 | Wyner | 375/37 |
| 4,507,794 A | 3/1985 | Jones et al. | 375/55 |
| 4,550,415 A | 10/1985 | Debus et al. | 375/14 |
| 4,601,045 A | 7/1986 | Lubarsky | 375/38 |
| 4,782,324 A | 11/1988 | Underwood | 341/147 |
| 5,063,574 A | 11/1991 | Moose | 375/27 |

OTHER PUBLICATIONS

Waters et al., "Phase Accuracy Experiments With a Direct–Sampling Coherent Detector," *NRL Report 9182,* Mar. 10, 1989.

Waters et al., "Sharply Bandlimited Signals for Sampled Data Communications," *NRL Report NRL/MR/5330–94–7481*, Jun. 1994.

*Primary Examiner*—Daniel T. Pihulic

(74) *Attorney, Agent, or Firm*—Barry A. Edelberg; Charles J. Stockstill

(57) ABSTRACT

This invention is a communication system utilizing sharply bandlimited waveforms for sampled data communications computed for each sample value in a sequence of data samples. The computed waveform is centered at a sample point, weighted by a corresponding data value, and truncated outside an appropriate time interval. Sampled digital data in a sequence of data samples is received by a computer and scaled according to the value $r(t_n)$. A waveform generator, controlled by a computer, generates a sharply bandlimited keying waveform for each data sample and weights each waveform with the data and forms the sum of weighted waveforms to form the output signal in digital form which is converted to analog form. The analog output of the waveform generator is passed through a low-pass filter to filter out any harmonics generated, up-converted to produce a desired carrier frequency which can then be multiplexed, if required, and output as radio frequency (RF) energy which can be received by any standard receiver.

3 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

(a)
(b)
(c)
(d)
(e)
CORRELATED $I_{max}$=435
MAXIMUM=52.77dB
AT 17.00μs
NOISE LEVEL=
32.87dB
CORRELATED $Q_{max}$=433
MAXIMUM=53.12dB
AT 17.00μs
NOISE LEVEL=
36.12dB
CORRELATED OUTPUT SOR
(I'1+Q'Q)
MAXIMUM = 55.96 dB
AT 17.00μs
NOISE LEVEL = 36.25dB
256 CHIPS .2 uses M1-7 FREQ=32.5
dB
TIME IN μs

COMMUNICATIONS SYSTEM USING A SHARPLY BANDLIMITED KEYING WAVEFORM

BACKGROUND OF THE INVENTION

1. Field of the Invention

This invention in general describes a communications system, specifically a communications system having sharply bandlimited waveforms for sampled data communications.

2. Description of the Related Art

Proliferation of communications, radar, and other systems making use of electromagnetic wave propagation has resulted in overcrowding in the useful portions of the electromagnetic spectrum. Even line-of-sight communications links seldom utilize frequencies above the X-band because of the absorption and scattering by rain and other constituents of the troposphere. Consequently, it becomes more important for transmitters to radiate signals with well confined spectra so limited spectral space is used more efficiently.

In order to communicate a sequence of sampled digital data, $r(t_n)$, over a band limited communications channel, the sequence of values must be transformed into an analog signal which is spectrally confined to the band available. Traditionally, confinement of radiated signals to assigned bands has been accomplished by frequency or phase modulation (FSK or PSK) followed by analog filtering operations at intermediate frequency and final amplifier stages of the transmitter. At the receiver, this signal is filtered from adjacent channels after appropriate down-conversion by utilizing analog filters to select the desired signal for subsequent conversion to digital form.

It is well known to those practicing the art that the spectrum of a signal formed from appropriate combinations of cardinal functions will have zero energy outside the designated frequency band width. For this to be exact, it is required that the cardinal functions be of infinite length. Theoretically, this causes no intersymbol interference since cardinal functions are zero at all sample points except one, t=0. Thus the analog/digital converter, appropriately synchronized and in the absence of noise, reads values of the transmitted sequence.

Functions of infinite length are not physically realizable. However, studies have shown that, by appropriately modifying the cardinal function, one can achieve excellent interpolation accuracies and resultant phase accuracies in direct sampling applications even if the function is truncated to just a few sample intervals.

In the field of electromagnetic transmission of digital data there is a need for an alternative to FSK and various forms of PSK signals which would improve the confinement of the signal spectrum to an assigned frequency band in transmitters and receivers. It is well known that bi-phase code modulation consists of a sequence of equal-length intervals, often called "chips". Within each chip a sinusoid at the carrier frequency is bi-phase modulated; more specifically, the carrier phase within a chip is constant but may jump from chip-to-chip by 180 degrees in accordance with modulating binary data. A drawback to the application of this waveform is the 180° phase "jump" which causes spreading of its spectrum. However, after a bi-phase signal is modified by the process which is the subject of this invention, its spectrum is well-defined to the desired band.

Further, it is important that adjacent communication channel interference and mutual interference among radar, navigation, communications and other systems which depend upon electromagnetic radiation be prevented.

SUMMARY OF THE INVENTION

It is the object of this invention to transform a communications sequence in a communications system into an analog signal which is spectrally confined to the band available for the transmission within a band limited communications channel without compromising communication accuracy.

Another object of this invention is to improve spectral confinement thereby allowing closer channel spacing and better electromagnetic compatibility among radar, navigation, and communications systems.

These and other objects are achieved by a communication system using sharply bandlimited signals for sampled data communications wherein a sharply bandlimited waveform is computed for each sample value in a sequence of data samples. Each waveform is centered at a sample point, is weighted by the corresponding data value, and is truncated outside an appropriate time interval. Resulting data-weighted waveforms are summed in the computer for all data samples of the sequence to be communicated, and the result is converted to analog form, up-converted to the desired carrier frequency, and transmitted. Because the signal spectrum is sharply bandlimited, communication channels may be spaced more closely, permitting more channels in the same frequency band.

At the receiver, signal-plus-noise is down-converted, data is sampled and converted to digital form, de-multiplexed (if necessary), and delivered to corresponding users.

DESCRIPTION OF THE PREFERRED EMBODIMENT

In order to communicate a sequence of sampled digital data over a bandlimited communications channel in a format other than the conventional analog format, a bi-phase code modulation utilizing a sharply bandlimited keying waveform may used.

A sharply bandlimited keying waveform is computed for each sample value in a sequence of data samples and centered at a sample point, weighted by a corresponding data value, and truncated outside an appropriate time interval. For a predetermined carrier frequency, $f_o$, it is well known in the art that sampling theory requires that the signal must be sampled at a rate $f_s=4f_o/(2M-1)$ which is greater than or equal to twice the signal bandwidth, where M is an integer. Defining the bandwidth to be $1/t_c$, where $t_c$ is the spacing between "chips" (elements of a phase code consisting of a sequence of equal-length intervals) or chip width, then the minimum sampling rate is $f_s=2/t_c$.

A signal with no spectral energy outside the band from −W to +W is completely specified by samples taken at uniform intervals less than or equal to ½ W. The original signal may be exactly reconstructed from these sampled values, $r(t_n)$, by the interpolation $$r(t)=\sum_{-\infty}^{+\infty} r(t_n)s(t-t_n) \tag{1}$$

where $t_n=n/2W$, n being the number of the samples, and the interpolation function, or sharply bandlimited keying waveform, sometimes called an interpolation waveform or sampling function, is $$s(t)=\frac{(\sin 2\pi Wt)}{(2\pi Wt)} \tag{2}$$

A bandpass signal with no spectral energy outside the bands −MW to −(M−1)W and (M−1)W to MW may also be completely specified by samples taken at ½ W (or shorter) intervals. The original function may be reconstructed exactly from these sampled values by the interpolation defined by Eq.(1).

Eq.(1) holds exactly only if s(t) as defined by Eq. (2) for the bandpass case is defined for all values of t from −∞ to +∞. The interpolation error (magnitude of the difference between right and left sides of Eq. (1)) grows as s(t) is truncated to shorter lengths, and as the width of the spectrum of the sampled signal, B, approaches ½ the sampling rate $f_s+2W$.

Figure 1:
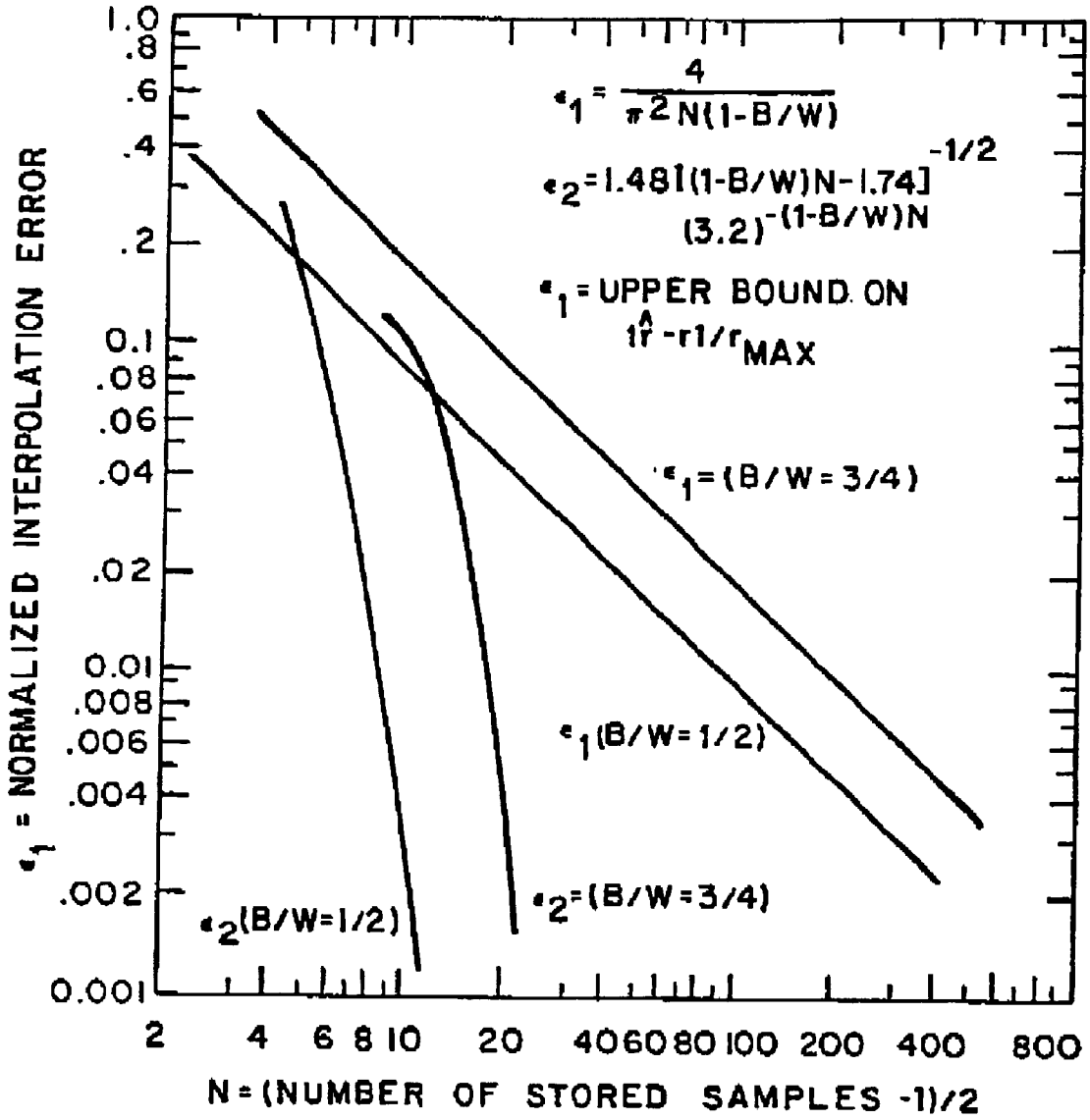
FIG. 1 shows the error for low-pass interpolation using cardinal functions and self-truncating cardinal functions for B/W=¾ and ½ (33% and 100% over-sampling, respectively) as a function of the truncation length as measured by N, the number of samples within the truncated interval.

FIG. 1 shows the error for low-pass interpolation (Eqs. (1) and (2)) for B/W=¾ and ½ (33% and 100% over-sampling, respectively) as a function of the truncation length as measured by N, the number of samples within the truncated interval. FIG. 1 also shows how the interpolation error shrinks dramatically (for large N) as a self-truncating "taper" is applied to the interpolation function. This tapered function is given for the low-pass case where q=1−B/W and m depends on both q and N.

$$s(t)=[\sin(2\pi qW/m)t/(2\pi qW/m)t]^m \sin 2\pi Wt/2\pi Wt \tag{3}$$

where q=1−B/W.

Since interpolation error is dramatically reduced using the "self-truncating" interpolation function, it is logically concluded that the spectrum of s(t) from Eq. (3) is better confined to the band −W to +W than of s(t) from Eq. (2). The same logic applies to the bandpass case since the taper of Eq. (3) (the bracketed factor raised to the power, m) may be used in the bandpass case with similar results.

Figure 2A:
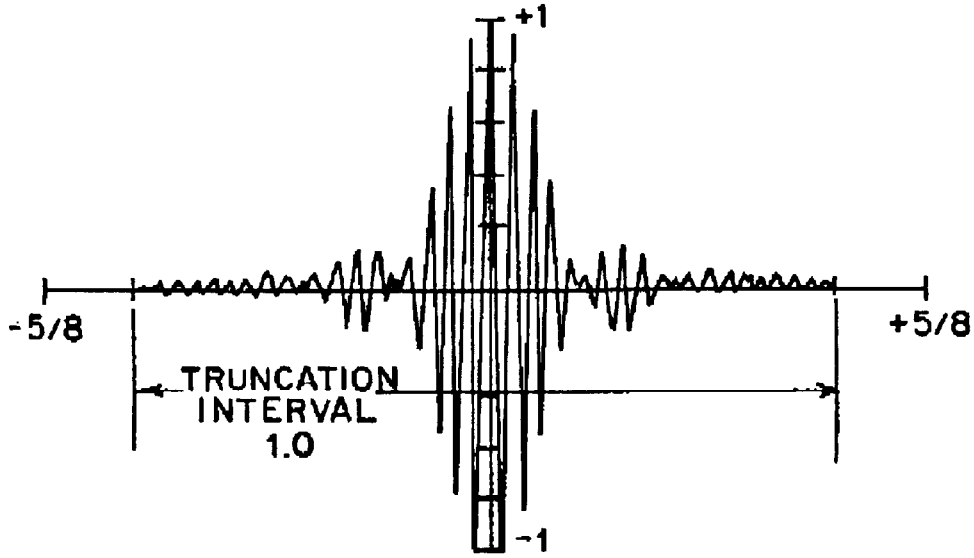
FIG. 2*a* shows the output of the waveform generator, the sharply bandlimited keying waveform.
Figure 2B:
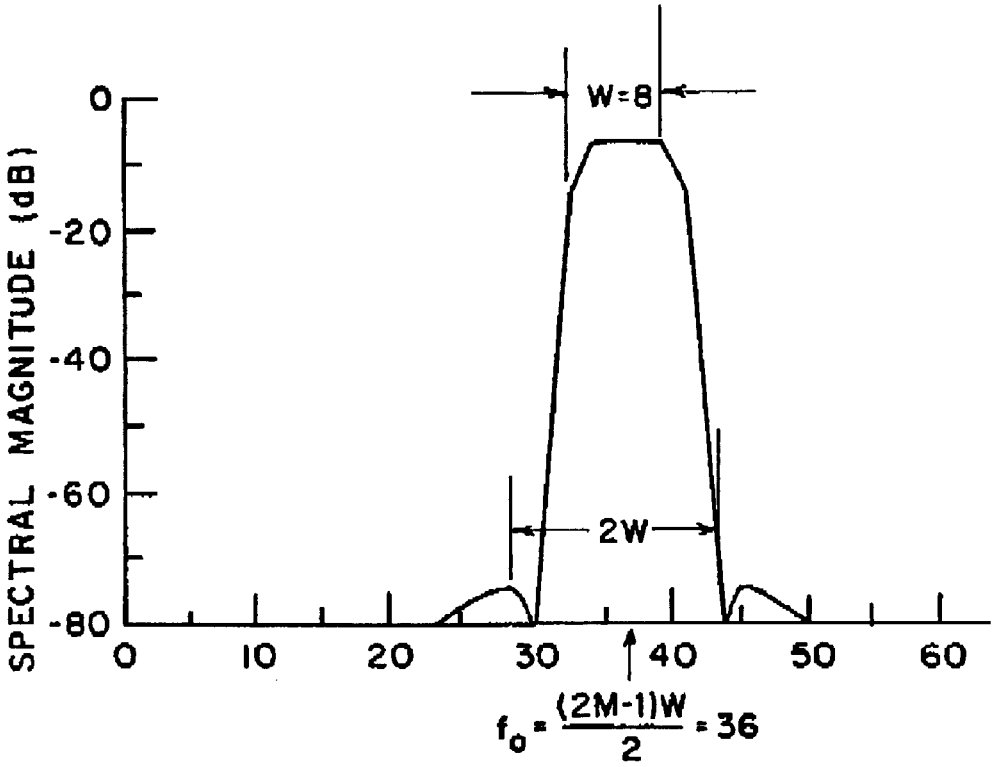
FIG. 2*b* shows the spectral confinement of the sharply bandlimited keying waveform.

The interpolation waveforms s(t) have the property that the zeros are at the right points so as not to cause intersymbol interference. An example of s(t) is plotted in FIG. 2*a*; the spectrum of s(t) is shown in FIG. 2*b*. Normally the keying waveform is truncated to a shorter time interval resulting in poor spectral confinement.

Figure 5:
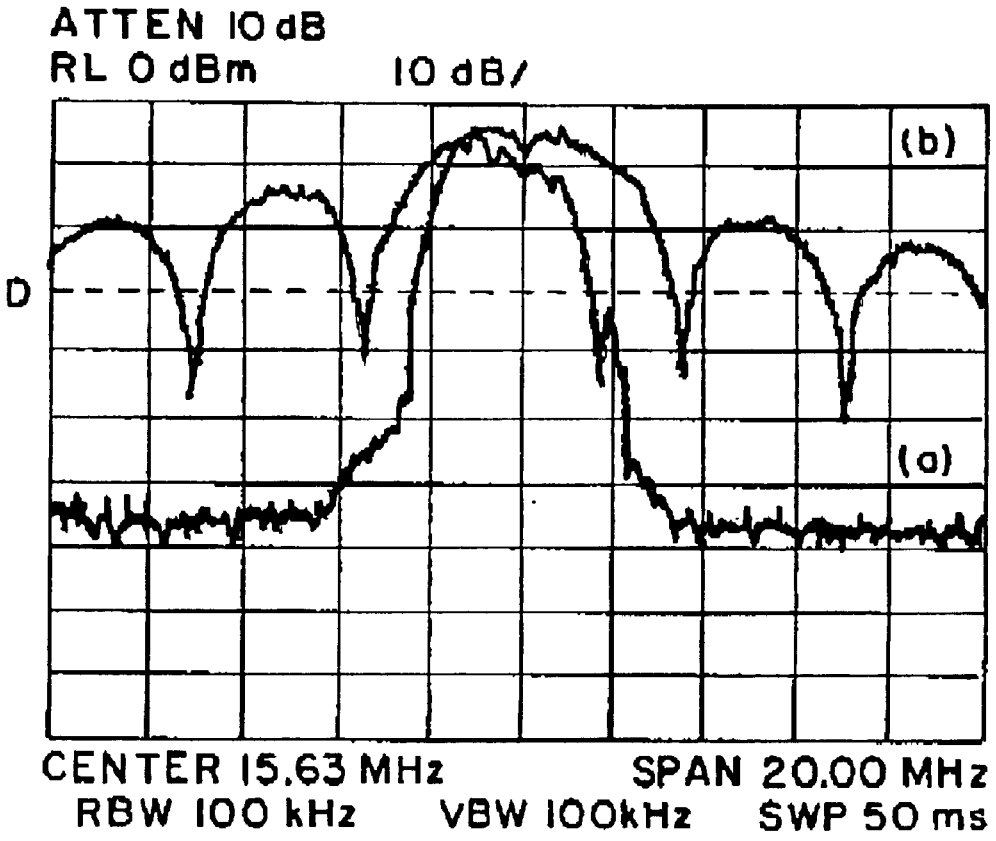
FIG. 5 shows (a) the measured spectrum of the output waveform of the waveform generator with interpolation and (b) the measured spectrum of the output waveform of the waveform generator without interpolation.

In the preferred embodiment, referring to FIG. 5, sampled digital data in a sequence of data samples 12, $r(t_n)$ input to the system 10 where computer 14 and waveform generator 16 generate a weighted interpolation waveform $r(t_n)s(t-t_n)$ for each data sample 12. The sampled input data 12 can be voice, television signals, pagers, or any other signal sampled as a function of time.

The sequence of data-weighted waveforms is summed in a computer 14 for all data samples of the sequence to be communicated, and the result is converted to analog form by a digital-to-analog (D/A) converter (not shown), filtered in a low-pass filter 22, up-converted to the desired carrier frequency in up-converter 18, and the signal is transmitted by a conventional method for transmission of electromagnetic waves, a transmitter 24.

The computer 14 receives a data bit stream from the sampled input data 12 and performs three functions. First, the computer 14 controls a waveform generator 16, secondly it weighs each waveform with the data and, thirdly, it forms the sum of weighted waveforms in digital form. The waveform generator 16 takes the digital data bits form the output signal and converts it to analog form by the use of an internal digital-to-analog (D/A) converter (not shown). The mathematical mechanism by which a waveform generator 16 synthesizes the bandlimited signal is as described above.

The output of the waveform generator 16 (the sharply bandlimited keying waveform shown in FIG. 2*a*) is passed through an integral or external low-pass filter 22 which filters out any harmonics previously generated. The filtered output of the waveform generator 16 is applied to an up-converter where the signal is up-converted to the desired carrier frequency by way of intermediate frequency (IF) stage to the transmitter 24 for generation of a sampled data signal output as radio frequency (RF) energy. A number of data channels may be multiplexed consistent with the bandwidth, if desired, by the application of the filtered analog signal from the low-pass filter 22 to a multiplexer 21.

A number of data channels may be grouped as sub-bands and a digital-to-analog (D/A) converter (not shown) would convert the data to an analog form at a rate consistent with the group bandwidth. Final separation of data channels may then be accomplished by digital filtering.

At a receiving location, the transmitted signal, plus any induced noise, is preamplified by a low-noise amplifier 28, demultiplexed by a demultiplexer 28 and down-converted by a low-noise amplifier filter down-converter 32, data is sampled and converted to digital form by an analog-to-digital (A/D) converter 34 , separated into separate channels by a digital channel separation filter 36, and applied to an audio or digital display device 38.

In the formation and transmittal of the sharply bandlimited signals for sampled data communications, the waveform generator 16 receiving the sample data delivers accurate data to the receiver 28 unless the remainder of the transmitter 24 distorts the radiated waveform. The up-converter 18 and transmitter 24 power amplifier (not shown) must exhibit a flat amplitude and linear phase characteristic across the signal band. Since the signal is bandlimited, this is more easily accomplished by analog low-pass filters 22. The better spectral confinement achieved through the use of the device set forth above leads to closer channel spacing and better electromagnetic compatibility among radar, navigation, and communications channels.

Operational data interpolation computer 14 may be performed by a finite impulse response (FIR) filter (not shown)

implemented by a digital signal processor (DSP) microchip, such as a Part no. DSP96002, manufactured by Motorola Corp. of Phoenix, Ariz. The preferred DSP should have a speed and digital precision to provide the same processing as computer 14, but requiring only a single microchip plus requisite drivers and power supplies. D/A conversion may also be performed by a much smaller unit than a waveform generator 16, such as a Model 1010-60-860, manufactured by KOR Industries of Garden Grove, Calif. digital-to-analog converter.

The better spectral confinement provided by this invention leads to closer channel spacing and better electromagnetic compatibility among radar, navigation, and communications systems.

Figure 4:
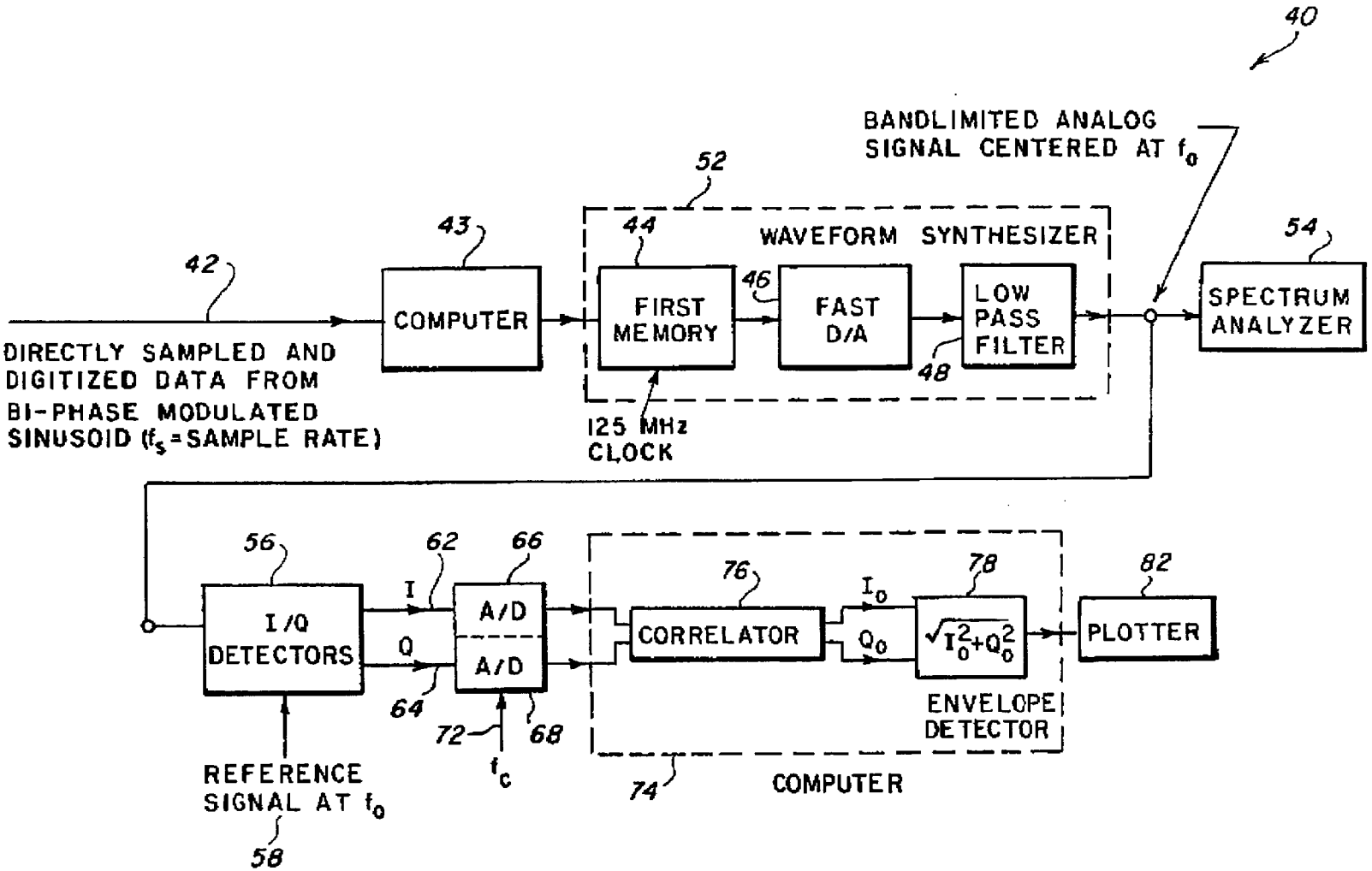
FIG. 4 depicts a test configuration for testing a sharply bandlimited communications system.

FIG. 4 depicts a sharply bandlimited keying waveform test configuration 40 of the preferred embodiment under laboratory conditions to verify that the output data is identical to the input data prior to operational data link interpolation. See, Sharply Bandlimited Signals for Sampled Data Communications, NRL/MR/5330—94—7481, Jun 94, which is hereby incorporated by reference.

Directly sampled and digitized data 42 from a pseudo-random bi-phase coded sinusoid (not shown) are selected by a computer 43 and entered into a waveform generator 52 synthesizer memory module 44. These data are used to weight the interpolation function previously described incorporating the computer program set forth in Table 1. Table 1 specifies mathematically the mechanism by which the waveform generator synthesizes the bandlimited signal from a sequence of data signals. Samples 42 are taken from the sinusoid at intervals, $t_s$, of 0.144 $\mu$s and have a width of biphase modulation chips, $t_c$, equal to 0.288 $\mu$s. Weighted and summed interpolation functions are computed at 0.008 $\mu$s intervals corresponding to a 125 MHz rate of the first memory 44 of the waveform generator 52 and read into a fast digital-to-analog (D/A) converter 46.

Figure 3:
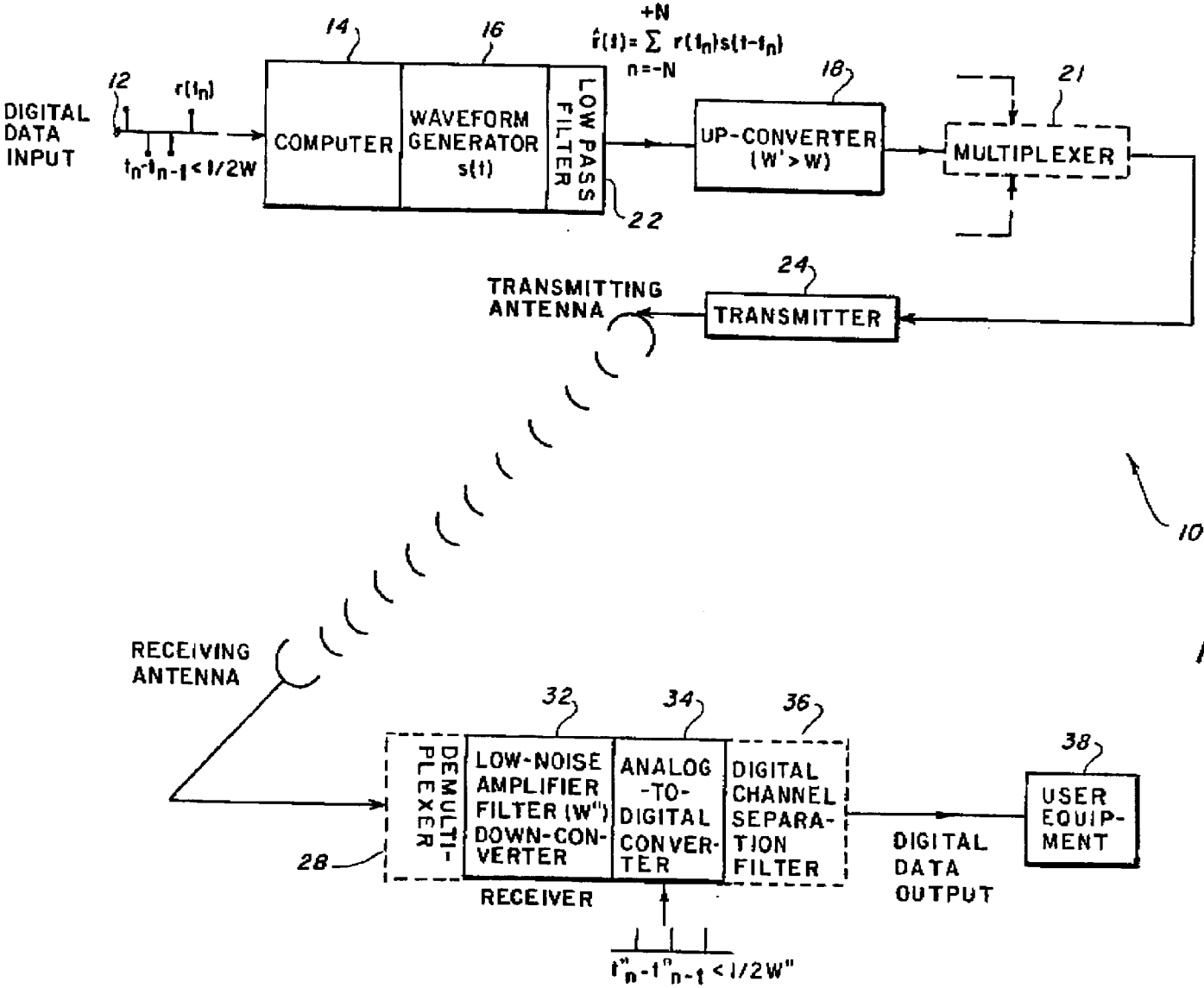
FIG. 3 is a schematic of a transmission system utilizing a sharply bandlimited communications filter.

Within the D/A converter 46, the digital values from first memory 44 are converted to analog form and low-pass filtered by a low-pass filter 48 (0 to 50 MHz) to form the bandlimited analog signal centered at $f_o$ output of the waveform generator 52, FIG. 3. The waveform generator 52 in the test installation functioned not only as a waveform generator but also as a D/A converter 46 and a low-pass filter 48. The spectrum, as shown in FIG. 5*a,* of the bandlimited analog signal of the waveform generator 52 is measured by a spectrum analyzer 54. FIG. 5*b* shows the spectrum of the same phase coded signal but without the weighting of Eq. (3).

To analyze the performance of the sharply bandlimited keying waveform system (ie., to determine fidelity with the digital sample 42 from the bi-phase phase modulated sinusoid), the I and Q components 66 and 64, respectively, of the output from the waveform generator 52 with the measured spectrum from the spectrum analyzer 54 are split out in an I/Q detector 56 when a reference signal 58 is heterodyned against the signal having the sharply bandlimited keying waveform in phase quadrature in order to obtain phase and amplitude information. Phase accuracy, where the phase, $\phi$, is defined as $\mathrm{Tan}^{-1}Q/I$, is dependent upon careful matching of these separate quadrature channels. Accordingly, phase errors limit the performance achievable from subsequent digital processing.

The digital outputs of the A/D converters 66 and 68 are applied to a computer 74 where the I and Q components are correlated with the pseudo random code used to generate the original input data samples 42 in the correlator 76, and an envelope detector 78 computes the square root of the sum of the squares which is applied to a plotter 82 for display of the test data.

Figures 6A, 6B, 6C, 6D, 6E:
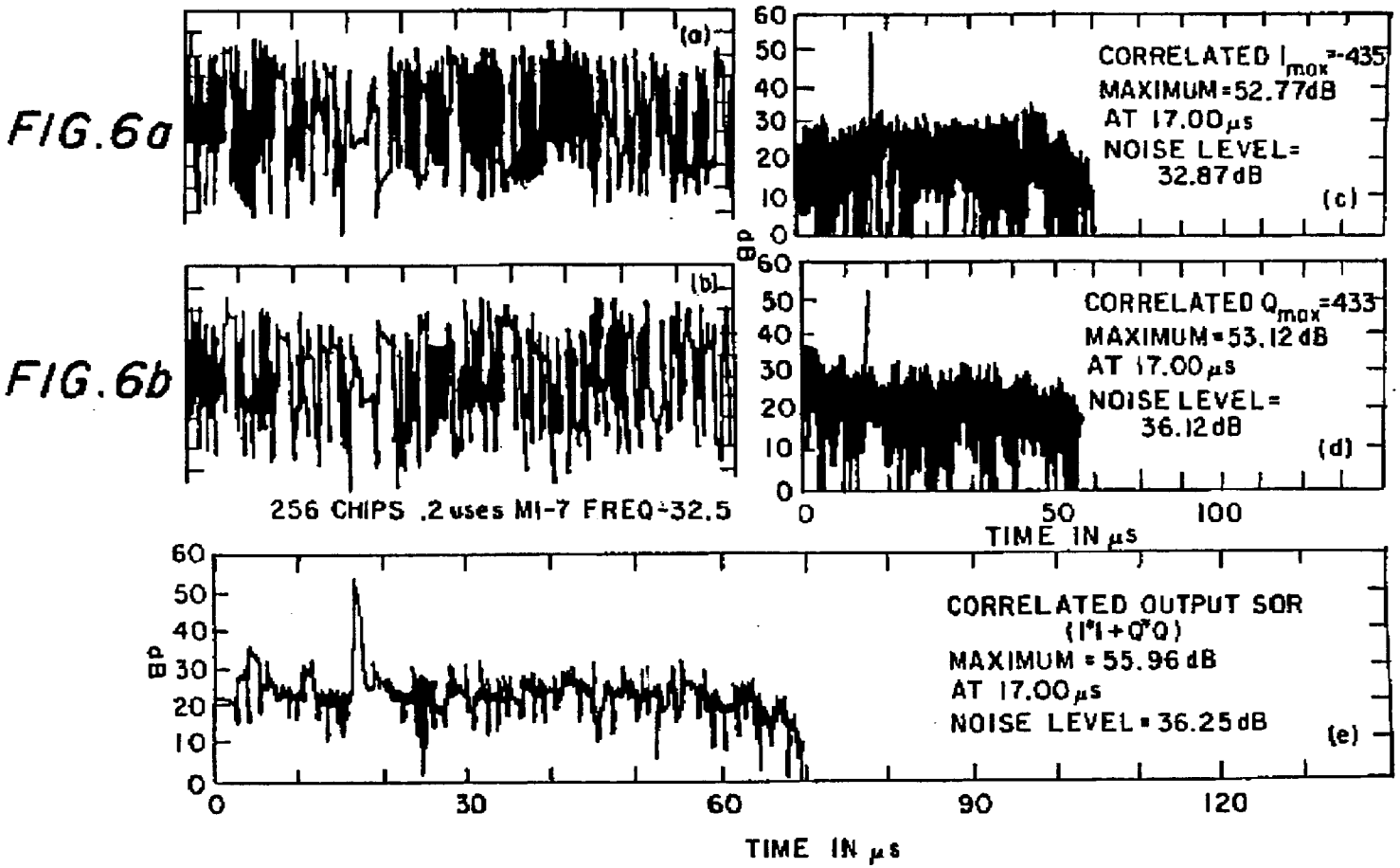
FIG. 6*a* shows the I component before processing.
FIG. 6*b* shows the Q component before processing.
FIG. 6*c* shows the I component after processing.
FIG. 6*d* shows the Q component after processing.
FIG. 6*e* shows the correlated magnitude $(I^2+Q^2)^{1/2}$ of the I and Q components.

In the test configuration 40, the particular values of $t_s$ and $t_c$ were chosen to be integer multiples of the waveform generators 52 fast memory read interval of 0.008 $\mu$s. The cycle period of the output signal carrier frequency was also chosen to be an integer multiple of 0.008 $\mu$s (1/15.625=0.064 and 1/31.25=0.032). The results of this test are shown in FIG. 6*a* through 6*c*. The curves in FIG. 6*a* and 6*b* depicts I and Q components of the received signal; FIGS. 6*c* and 6*d* show the I and Q components after correlator processing and FIG. 6*e* depicts the correlated magnitude $(I^2+Q^2)^{1/2}$ from FIGS. 6*c* and 6*d*.

It will be understood by those skilled in the art that still other variations and modifications are possible and can be affected without detracting from the scope of the invention as defined by the claims.

TABLE 1

```
10!        RE-STORE "W_256BIPH1:,1400,1"
20         ! PROGRAM TO GENERATE A DIRECT SAMPLED MAXIMAL
LENGTH BIPHASE WAVEFORM WITH WEIGHTED CHIPS
30         ! FOR OUTPUT TO THE HP8770 WAVEFORM SYNTHESIZER
40             PRINTER IS CRT
50             ! GENERATE MAXIMAL LENGTH SHIFT REGISTER
SEQUENCE
60             OPTION BASE 1
70             SEPARATE ALPHA FROM GRAPHICS
80             GCLEAR
90             INTEGER X(8), Xs(255)
100            INTEGER I,J,K,N,Pn,Ix,Ic,Xn,Ns,Nz,Nc,
Chip,Chs,Che
110            DIM F1$|60|
120            DIM Aa(25), La(25), Ra(25)
130            DIM W$|32767|
140            DIM Comm$|96|
141            GOTO 1250
150            Ix=67 !INITIAL CONDITION
160            N=8 !NUMBER OF STAGES
170            Ic=Ix
180            FOR I=N TO 1 STEP -1 ! SET INITIAL CONDITION
190              X(I)=0
200              Pn=2"(I-1)
210              IF Ic>=(Pn) THEN X(I)=1
```

TABLE 1-continued

```
220          IF Ic>=(Pn) THEN Ic=Ic−Pn
230        NEXT I
240        Pn=2"N−1 ! NUMBER OF ELEMENTS IN SEQUENCE
250        FOR I=1 TO Pn
260          Xn=(X(8)+X(4)+X(3)+X(2)) MOD 2! FEEDBACK
CONNECTION
270          Xs(I)=X(8)
280          S=0
290          FOR K=1 TO N
300            S=S+X(K)*2"(K−1)
310          NEXT K
320          PRINT USING ""(D),3X,DDD";X(8),X(7),X(6),
X(5),X(4),X(3),X(2), X(1),S
330          FOR J=N TO 2 STEP −1
340            X(J)=X(J−1)
350          NEXT J
360          X(1)=Xn
370        NEXT I
380        RAD
390        DISP "ENTER CHIP WIDTH IN MICROSECONDS";
400        INPUT Tc
410        DISP "ENTER THE CARRIER FREQUENCY";
420        INPUT F
430        W=125.
440       ! DISP "ENTER THE SAMPLING RATE OF THE HP8770";
450       ! INPUT W
400        DISP "ENTER NAME OF FILE WHERE DATA IS TO BE
STORED";
470        INPUT Nam$
480        DISP " ENTER A COMMENT DESCRIBING WAVEFORM";
490        LINPUT Comm$
500        Nc=T*W!NUMBER OF SAMPLES IN CHIP
510        Ns=Nc*Pn
520        Print "NUMBER OF SAMPLES IS ";Ns
530        PRINT "LENGTH OF PULSE IS ";Ns/W
540        Nz=(1−FRACT Ns/8))*8
550        PRINT Nz;" ZEROS WILL BE ADDED TO MAKE SAMPLES A
MULTIPLE OF 8"
560        Tp=(Nz+Ns)/W
570        PRINT " TOTAL PULSE WILL BE ";Tp
580        PRINT
590        PRINT " +− 1 12-BIT WEIGHT"
600        VIEWPOINT 10,150,15,90
610        WINDOW 0,(Ns/w),−2048,2048
620        WINDOW 0,(Ns/W)/16,−1200,1200
630        FRAME
640        CLIP OFF
650        L=1
660        ! INTERPOLATION FUNCTION PARAMETERS
670        M1=13 ! FOR Λ .4 CHIP LENGTH !5 ! FOR Λ
.144 CHIP LENGTH
680        M2=2
690        U=.1
700        Fo=F
710        Ws=2*Fo/(2*M1 −1)
720        Ic=0
721        Tw=Tc/2
722        Tw2=Tw/2
730        FOR T=0 TO (Ns/W) STEP 1/W ! STEP THROUGH THE
ENTIRE PULSE
740          Chip=(T*W)/Nc+.5
750          Chs=Chip−5
760          Che=Chip+5
770        ! TAPER START AND END
780          IF Chip<=5 THEN Chs=5
790          IF Chip>=Pn−4 THEN Che=Pn−4
800          FOR N=Chs TO Che
801            FOR M−1 TO 2
810              Y=2*PI*Ws*(T−Tc*N−M*Tw+Tw2)
820              IF Y=0 THEN
830                S3=1
840                GOTO 910
850              ELSE
860                GOTO 880
870              END IF
880              S1=(SIN(M1*Y)−SIN((M1−1)*Y))/Y
890              S2=(SIN(U*Y)/(U*Y))"M2
900              S3=S1*S2
910              S1=((−1)"N)*(Xs(N)−.5)*2*S3
```

TABLE 1-continued

```
920                 V=V+S4
921               NEXT M
930             NEXT N
940             ! LIMIT AMPLITUDE TO 1 V PEAK
950             V=V*.4
960             Mag=ABS(V)
970             IF Mag>=1 THEN V=V/Mag*.99
980             Ic=Ic+1
990             Z=INT(V*2047+.5)
1000            PLOT T,Z
1010            W$|L,L|=CHR$(BINAND(255,BINAND(Z,-256)/256))
1020            W$|L+1,L+1|I=CHR$(BINAND(Z,255))
1030            L=L+2
1040!PRINT USING "DDDDD,4X,DD.DDDD,4X,DDDDDD,4X,
D.DDD";I,X,Z,Y
1050            V=0
1060          NEXT T
1070          Nz=(1-FRACT(Ic/8)*8
1080          PRINT Nz;" ZEROS WILL BE ADDED TO MAKE SAMPLES A
MULTIPLE of 8"
1090          FOR I=1 TO Nz
1100            Ic=Ic+1
1110            W$|L,L|=CHR$(0)
1120            W$|L+1,L+1|=CHR$(0)
1130            L=L+2
1140          NEXT I
1150          PRINT "TOTAL SAMPLES=";Ic
1160          B=0
1170          Cdir=0
1180          CREATE BDAT Nam$,1,L+200
1190          ASSIGN @Wf TO Nam$
1200          OUTPUT @Wf;L-1,W$|I1,L-1|,Cdir,F,B,Tp,W,Comm$
1210          ASSIGN @Wf TO *
1220!         PRINT "=****** DONE *******"
1230!
1240!
1250!
1260!         PROGRAM TO READ WAVEFORMS AND OUTPUT IN AN
ARBITARY SEQUENCE
1270!         CONVERTED TO SERIES 300 3/30/88 MOD 4/14/88
1280!         PRINTER IS CRT
1290          GCLEAR
1300          CLEAR SCREEN
1310          PRINT " PROGRAM TO SEND WAVEFORMS TO
HP8770"
1320          PRINT
1330          PRINT " AS A MINIMUM, FUNCTION KEYS 1 AND 2
NEED TO BE USED
1340          PRINT " 1 TO LOAD WAVEFORMS FROM DISC AND
STORE IN THE 8770 MEMORY"
1350          PRINT " 2 TO SET UP THE SEQUENCING OF THE
WAVEFORM DATA"
1360          PRINT
1370          PRINT "A MODE EXISTS VIA KEY 5 TO CHANGE TIME
DELAY BY ENTRY OF TIME IN MICROSECONDS"
1380          ON KEY 1 LABEL "LOAD WAV" GOSUB 1480
1390          ON KEY 2 LABEL "SEQ SET" GOSUB 1820
1400          ON KEY 3 LABEL "SEQ CHG" GOSUB2180
1410          ON KEY 4 LABEL "STATUS" GOSUB 2030
1420          ON KEY 5 LABEL "DEL TIME" GOSUB 2250
1430          ON KEY 6 LABEL "CLOCK" GOSUB 2570
1440          ON KEY 7 LABEL "CAT" GOSUB 2690
1450          ON KEY 8 LABEL "RESTART" GOTO 1280
1460          KEY LABELS ON
1470          GOTO 1470
1480          F1$=""
1490          OUTPUT 719;"*RST"
1500          OUTPUT 719;"PURGE BOTH"
1510          OUTPUT 719;"FORMAT SIGN"
1520          GOSUB 2570 !SELECT CLOCK SOURCE
1530          A=0
1540          S$=VAL$(A)! START FIRST WAVEFORM SEGMENT AND
PACKET AT ZERO
1550          DISP "ENTER THE NUMBER OF WAVEFORM FILES";
1560          INPUT J
1570          FOR I=1 TO J
1580            DISP "ENTER FILE NAME";
1590            INPUT F$
1600            F1$=F1$&F$&"*"
```

TABLE 1-continued

```
1610            NEXT I
1620            K=1
1630            PRINT " WAVEFORM MEMORY CONTENTS"
1640            PRINT " NAME LENGTH IN SAMPLES ADDRESS
PULSE W at CLOCK BANDWIDTH START FREQ"
1650            FOR I=1 TO J
1660              M=POS(F1$|K|,"*")
1670              F$=F1$|K,K+M−2|
1680              ASSIGN @W1 TO F$
1690              K=K+M
1700              ENTER @W1,1;L,W$,Cdir,Fs,B,T,W,Comm$! READ
NUMBER OF BYTES IN, AND DATA
1710              Nn(I)=L/2
1720              N$=VAL$(Nn(I))! NUMBER OF WAVE SEGMENTS
1730              PRINT USING "10A,4X,DDDDD,11X,DDDDD,6X,DDD.D,
4A,DDD,5X,DDD.DDD,6X,DD.DDD";F$,Nn(I),A,T," at ",W,B,Fs
1740              A1(I)=A
1750              U$|1,1|=CHR$(BINAND(255,BINAND(L,−256)/256))
1760              U$|2,2|=CHRS$(BINAND(L,255))
1770              OUTPUT 719;"WMEM "&S$&",#A"z&U$&W$|1,L|
1780              A=A+Nn(I)
1790              S$=VAL$(A) NEXT START ADDRESS
1800            NEXT I
1810            RETURN
1820            DISP "ENTER NUMBER OF WAVEFORM SEGMENTS";
1830            INPUT J2
1840            Y=1
1850            J1=J2
1860            FOR I=Y TO J1
1870              DISP "ENTER SEGMENT STARTING ADDRESS";
1880              INPUT Aa(I)
1890              DISP "ENTER LENGTH OF SEGMENT";
1900              INPUT La(I)
1910              DISP "ENTER NUMBER OF TIMES TO REPEAT
SEGMENT";
1920              INPUT Ra(I)
1930            NEXT I
1940            OUTPUT 719;"PURGE SEQ"
1950            FOR I=1 TO J2
1960              S$=VAL$(Aa(I))
1970              N$=VAL$(La(I))
1980              R$=VAL$(Ra(I))
1990              OUTPUT 719;"PACLIT "&S$&","&N$&","&R$&", AUTO"
2000            NEXT I
2010            OUTPUT 719;"GO"
2020            RETURN
2030            PRINT " SEQUENCE STATUS"
2040            PRINT "ADDRESS LENGTH REPEATS TIME"
2050            FOR I=1 TO J2
2060              PRINT USING "DDDDD,3X,DDDDD,5X,DDDDD,4X,
DDDD.DDD";Aa(I),La(I),Ra(I),Ra(I)/F*LA(I)
2070            NEXT I
2080            PRINT " WAVEFORM MEMORY CONTENTS"
2090            PRINT " NAME LENGTH IN SAMPLES ADDRESS'
2100            K=1
2110            FOR I=1 to J
2120              M=POS(F1$|K|,"*")
2130              F$=F1$|K,K+M−2|
2140              K=K+M
2150              PRINT USING
"10A,4X,DDDDD,12X,DDDDD,";F$,Nn(I),
A1(I)
2160            NEXT I
2170            RETURN
2180            CLEAR SCREEN
2190            GOSUB 2080
2200            DISP "TO CHANGE ONE SEGMENT ENTER SEGMENT
NUMBER";
2210            INPUT Y
2220            J1=Y
2230            GOTO 1860
2240            RETURN
2250!                GENERATING WAVEFORM SEQUENCES OF DESIRED
TIME DURATION
2260            J2=J2+1
2270            PRINT "AT START THERE MUST BE ONLY ONE ZERO
SEGMENT IN SEQUENCE"
2280            DISP "ENTER ADDRESS OF ZERO WAVEFORM SEGMENT";
2290            INPUT Z
```

TABLE 1-continued

```
2300        DIPS "ENTER SEQUENCE POSITION OF ZEROS";
2310        INPUT I2
2320        FOR I=J2 TO I2+2 STEP -1
2330          Aa(I)=Aa(I-1)
2340          La(I)=La(I-1)
2350          Ra(I)=Ra(I-1)
2360        NEXT I
2370        DISP "ENTER DESIRED TIME";
2380        INPUT T
2390        IF T<6.1 THEN T=6.1
2400        L=INT(F/8+.5)*8! SEQUENCE MUST BE MULTIPLE OF 8
2410        R1=INT((T-3)/L*F)! REPETITIONS OF SEQUENCE L
2420        T2=T-R1*L/F
2430        L2=INT(T2*F/8+.5)*8
2440        R2=1
2450        Aa(I2)=Z
2460        La(I2)=L
2470        Ra(I2)=R1
2480        Aa(I2+1)=Z
2490        La(I2+1)=L2
2500        Ra(I2+1)=R2
2510        GOSUB 1940
2520        GOSUB 2030
2530        DISP "TO EXIT, ENTER AN E -- TO CONTINUE,
ANTHING ELSE";
2540        INPUT E$
2550        IF E$="E" THEN RETURN
2560        GOTO 2370
2570       ! ROUTINE TO MODIFY CLOCK SELECTION
2580        DISP "enter an EXT for external clock
otherwise the internal 125MHz is assumed";
2590        INPUT Cls$
2600        IF Cls$="EXT"THEN 2650
2610        F=125
2620        PRINT "INTERNAL CLOCK SELECTED FREQUENCY
ASSUMED ";F
2630        OUTPUT 719;"CLKSEL INT"
2640        RETURN
2650        F=120
2660        PRINT "EXTERNAL CLOCK SELECTED FREQUENCY
ASSUMED ";F
2670        OUTPUT 719;"CLKSEL EXT"
2680        RETURN
2690       ! GET A CATALOG OF DISC
2700        CAT
2710        RETURN
2720        END
```

What is claimed is:

1. A communications system comprising:

means for generating a digital data sample;

means for generating a sharply bandlimited keying waveform responsive to the digital data sample centered at a sample point;

means for weighting the sharply bandlimited keying waveform by a corresponding data sample value and truncating outside an appropriate time interval; and means for transmitting the weighted sharply bandlimited keying waveform.

2. A communications system, as in claim 1, wherein the means for generating an sharply bandlimited keying waveform for a data sample is a wave form generator.

3. A method for transmitting a digital signal comprised of the steps of:

sampling a first digital data signal to produce a digital data sample;

generating a sharply bandlimited keying waveform for the digital data sample;

weighting the sharply bandlimited keying waveform with a corresponding data sample value and truncating outside an appropriate time interval;

converting the weighted sharply bandlimited keying waveform into an analog signal; and transmitting the analog signal.

* * * * *